US008265430B2

(12) United States Patent  (10) Patent No.: US 8,265,430 B2
Matsubara  (45) Date of Patent: Sep. 11, 2012

(54) IMAGE PROCESSING SYSTEM, IMAGE PROCESSING METHOD, AND STORAGE MEDIUM

(75) Inventor: Akio Matsubara, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 787 days.

(21) Appl. No.: 12/385,593

(22) Filed: Apr. 14, 2009

(65) Prior Publication Data

US 2009/0257681 A1  Oct. 15, 2009

(30) Foreign Application Priority Data

Apr. 14, 2008 (JP) ................................. 2008-104556
Feb. 5, 2009 (JP) ................................. 2009-025017

(51) Int. Cl.
*G06K 9/54* (2006.01)
(52) U.S. Cl. ........ 382/305; 382/128; 382/133; 382/129; 382/134; 600/168; 348/79
(58) Field of Classification Search .................. 382/305, 382/128, 133, 129, 134; 600/168; 348/79
See application file for complete search history.

(56) References Cited

U.S. PATENT DOCUMENTS

| 5,838,821 A | 11/1998 | Matsubara et al. |
| 7,113,645 B2 | 9/2006 | Sano et al. |
| 2003/0068089 A1 | 4/2003 | Sano et al. |
| 2004/0146206 A1 | 7/2004 | Matsubara |
| 2004/0151387 A1 | 8/2004 | Sakuyama et al. |
| 2004/0223510 A1 | 11/2004 | Tzannes et al. |
| 2006/0025670 A1* | 2/2006 | Kim et al. ..................... 600/407 |
| 2006/0067561 A1 | 3/2006 | Matsubara |
| 2006/0188137 A1* | 8/2006 | Bacus et al. ................. 382/128 |
| 2007/0256057 A1 | 11/2007 | Matsubara |

FOREIGN PATENT DOCUMENTS

| JP | 2001-257596 | 9/2001 |
| JP | 2002-189586 | 7/2002 |
| JP | 2003-099299 | 4/2003 |
| JP | 2004-261597 | 9/2004 |
| JP | 2006-260335 | 9/2006 |

OTHER PUBLICATIONS

Japanese Office Action dated Nov. 23, 2010.

(Continued)

*Primary Examiner* — Mike Rahmjoo
(74) *Attorney, Agent, or Firm* — Harness, Dickey & Pierce, P.L.C.

(57) ABSTRACT

An image processing system includes a plurality of clients, a plurality of servers, and a computer. The computer includes a user application and a multi-target controller. The user application interactively operates with a user. The multi-target controller causes the plurality of clients to synchronously access the plurality of servers in response to a request from the user application, acquire from the plurality of servers a plurality of pieces of target data corresponding to a plurality of sub-regions in a draw region of the user application, and expand the plurality of pieces of target data into a plurality of pieces of draw data. The multi-target controller further combines the plurality of pieces of draw data returned from the plurality of clients into single draw data and passes the single draw data to the user application.

15 Claims, 13 Drawing Sheets

OTHER PUBLICATIONS

"Ajax: Google Maps" http://_www.openspc2.org/JavaScript/Ajax/GoogleMaps/index.html, pp. 1-14, revised on Nov. 17, 2005.

Information technology—JPEG2000 image coding system—part 9: Interactivity tools, API's and protocols, ISO/IEC FDIS 15444-9:2004(E), ISO/IEC JTC1/SC29/WG1, Mar. 20, 2004.

"Information technology—JPEG2000 Image Coding System—Part 1", ISO/IEC FDIS 15444-1 2002, ISO/IEC JTC1/SC29/WG1 N2750, Aug. 18, 2000.

"Information Technology—JPEG 2000 image coding system—Part 9: Interactivity tools, API's and protocols AMENDMENT 1: API's, metadata, and editing", ISO/IEC 15444-9/FDAM1(E), ISO/IEC JTC1/SC29/WG1 N3806, Dec. 1, 2005.

"Information technology—JPEG2000 image coding system—Part 6: Compound image file format, AMENDMENT1: Hidden text metadata", ISO/IEC 15444-6: 2003/FPDAM1, ISO/IEC JTC1/SC29/WG1, Jul. 11, 2006.

Tian, Y. et al., "JPIP-Based Wireless Transmission and Display of High Resolution DICOM Medical Images," Chinese Journal of Medical Instrumentation, pp. 9-11, Dec. 31, 2006.

Chinese Office Action mailed Jul. 6, 2011.

* cited by examiner

SYNCHRONIZATION OF COLOR COMPONENT

SYNCHRONIZATION OF IMAGE QUALITY

SYNCHRONIZATION OF SERIAL PAGES

IMAGE PROCESSING SYSTEM, IMAGE PROCESSING METHOD, AND STORAGE MEDIUM

CROSS-REFERENCE TO RELATED APPLICATIONS

The present patent application claims priority pursuant to 35 U.S.C. §119 from Japanese Patent Application Nos. 2008-104556, filed on Apr. 14, 2008, and 2009-025017, filed on Feb. 5, 2009 in the Japan Patent Office, the entire contents of each of which are hereby incorporated herein by reference.

BACKGROUND OF THE INVENTION

1. Field of the Invention

Illustrative embodiments of the present invention relate to an image processing system, and more specifically, to an image processing system capable of acquiring a plurality of pieces of data dispersed-among a plurality of servers to draw images on a plurality of sub-regions of a draw region.

2. Description of the Background

A conventional system architecture is known in which, when tomograms taken using a plurality of computer tomography (CT) apparatuses are stored in a remote server as JPEG (Joint Photographic Experts Group)2000 files, a plurality of personal computers (PCs) is capable of displaying a high-resolution and high-quality image in a region of interest (ROI) of a tombgram by separately accessing respective packets of the JPEG2000 files. However, no description is given of how the system architecture operates when portions of such an image in the ROI to a user are dispersed among a plurality of servers.

A conventional multicarrier transceiver synchronously displays a plurality of contents by synchronizing multiple applications to transmit video, sound, and ATM (asynchronous transfer mode) data, and is used for the broadcast of such contents. Although the multicarrier transceiver synchronizes independent information sources, such as motion picture, sound, and ATM data, the multicarrier transceiver is not configured to access only certain desired content portions in accordance with a user's request like a client/server model.

Similarly, as one example of use of Ajax (asynchronous JavaScript and XML), an operation procedure of Google Maps (trademark) is described at a Web page (http://www.openspc2.org/JavaScript/Ajax/GoogleMaps/index.html). For this example, when GIF (graphic interchange format) image data of an area located at a geographic location (x,y) is stored on a server, JavaScript allows a web browser, such as Internet Explorer (trademark), to access an image(s) of an area requested by a user and display the image(s) at a desired resolution in GIF. In such a case, since the user's requested area does not necessarily consist of a single image, the web browser accesses a plurality of images in a sequential manner.

In the above-described web-page document, images representing a geographic location are sequentially accessed in the main-scan direction and the sub-scan direction. Consequently, if one of a plurality of servers or a network linking the plurality of servers goes down when a client is accessing an image, the client is forced into a wait state even when servers storing subsequent images are operable, resulting in reduced availability. Further, since the images representing each location are created in GIF format without tiling or precinct division, redundant portions of GIF images may be transmitted through a communication path depending on a relation in horizontal and vertical sizes between each GIF image and a display area, resulting in reduced transmission efficiency. Further, the upper limit of 256 colors in the number of color components may be a constraint on color reproducibility of the original image, and other disadvantages such as unavailability of multi-layer structure may appear with respect to image quality.

IS15444-9 "Information technology—JPEG 2000 image coding system—Part 9: Interactivity tools, APIs and protocols" describes a method of interactively accessing an ROI for a user in a JPEG2000 file stored on a server. However, although IS15444-9 defines a request-and-response procedure between a client and a server, it has no description of a method of seamlessly accessing files associated with content that is dispersed among multiple servers.

SUMMARY OF THE INVENTION

The present disclosure provides an image processing system capable of drawing a seamless image on a plurality of sub-regions of a draw region based on a plurality of images stored in a plurality of servers.

In one illustrative embodiment, an image processing system includes a plurality of clients, a plurality of servers, and a computer. The computer includes a user application and a multi-target controller. The user application interactively operates with a user. The multi-target controller causes the plurality of clients to synchronously access the plurality of servers in response to a request from the user application, acquire from the plurality of servers a plurality of pieces of target data corresponding to a plurality of sub-regions in a draw region of the user application, and expand the plurality of pieces of target data into a plurality of pieces of draw data. The multi-target controller further combines the plurality of pieces of draw data returned from the plurality of clients into single draw data and passing the single draw data to the user application.

In another illustrative embodiment, a storage medium stores a user application and a multi-target controller executable on a computer in an image processing system. The user application interactively operates with a user. The multi-target controller causes a plurality of clients to synchronously access a plurality of servers in response to a request from the user application, acquire from the plurality of servers a plurality of pieces of target data corresponding to a plurality of sub-regions in a draw region of the user application, and expand the plurality of pieces of target data into a plurality of pieces of draw data. The multi-target controller combines the plurality of pieces of draw data returned from the plurality of clients into single draw data and passing the single draw data to the user application.

In still another illustrative embodiment, an image processing method for an image processing system having a plurality of clients, a plurality of servers, and a computer including a user application interactively operating with a user and a multi-target controller includes the steps of causing the plurality of clients to synchronously access the plurality of servers in response to a request from the user application; acquiring from the plurality of servers a plurality of pieces of target data corresponding to a plurality of sub-regions in a draw region of the user application; expanding the plurality of pieces of target data into a plurality of pieces of draw data; combining the plurality of pieces of draw data returned from the plurality of clients into data constituting a single unified image; and passing the data constituting a single unified image to the user application.

BRIEF DESCRIPTION OF THE DRAWINGS

A more complete appreciation of the disclosure and many of the attendant advantages thereof will be readily acquired as the same becomes better understood by reference to the following detailed description when considered in connection with the accompanying drawings, wherein.

Figure 1:
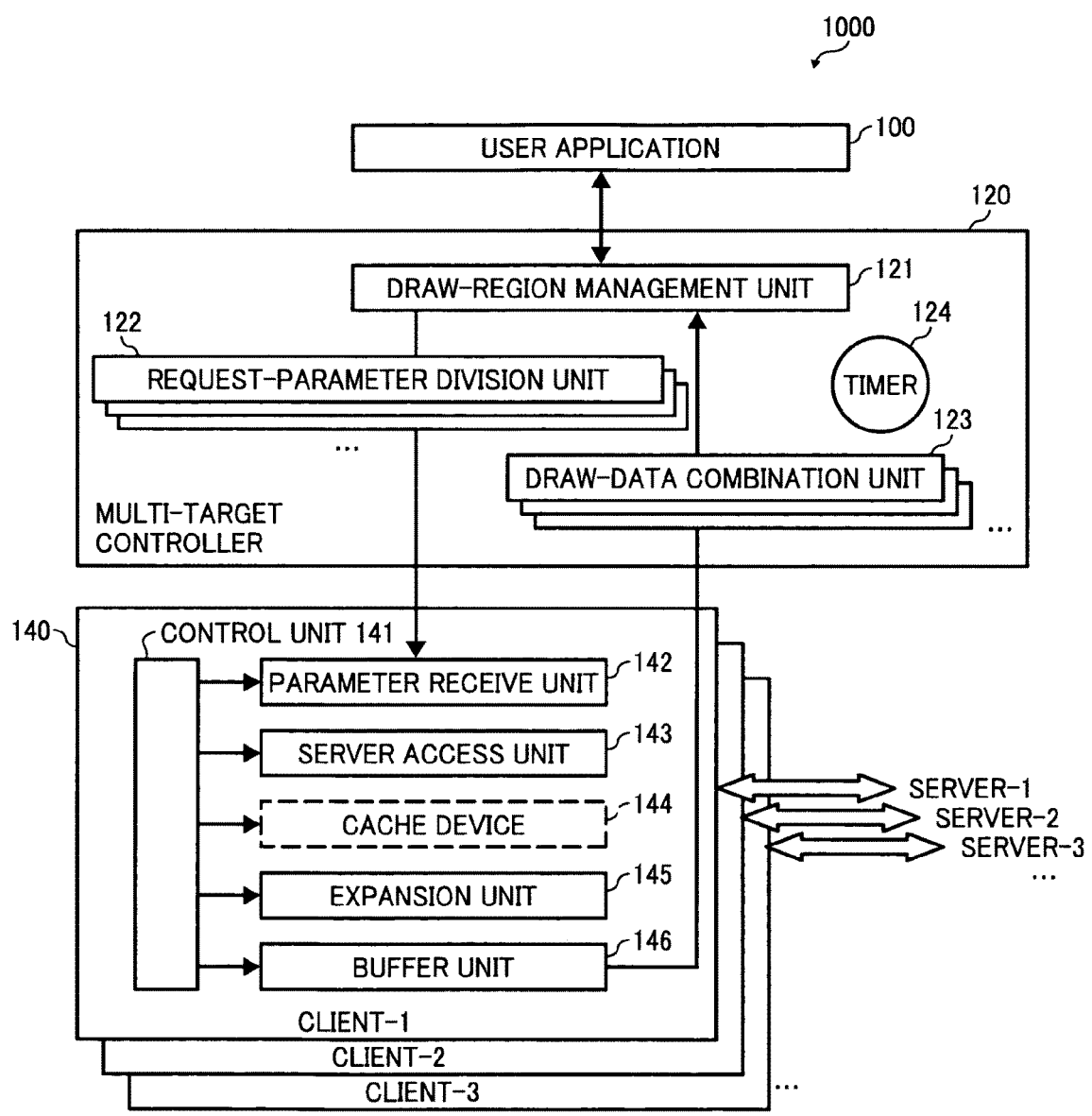
FIG. 1 is a block diagram illustrating a configuration of an image processing system according to an illustrative embodiment of the present disclosure.

The accompanying drawings are intended to depict illustrative embodiments of the present disclosure and should not be interpreted to limit the scope thereof. The accompanying drawings are not to be considered as drawn to scale unless explicitly noted.

DETAILED DESCRIPTION OF ILLUSTRATIVE EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the illustrative embodiments are described with technical limitations with reference to the attached drawings, such description is not intended to limit the scope of the present invention and all of the components or elements described in the illustrative embodiments of this disclosure are not necessarily indispensable to the present invention.

Below, a description is given of illustrative embodiments according to the present disclosure with reference to the drawings.

FIG. 1 is a block diagram illustrating a configuration of an image processing system 1000 according to an illustrative embodiment of the present disclosure.

The image processing system 1000 is implemented as software operable on a computer, such as a personal computer (PC), and includes an application program (hereinafter "user application") 100 with which a user directly interacts, a multi-target controller 120, and a plurality of clients 140. The clients 140 may operate on one or more computers except the computer(s) on which the user application 100 and the multi-target controller 120 and may be implemented as hardware devices. In the image processing system 1000, respective pairs of clients and servers independently operate according to a client-server model.

The image processing system 1000 allows a user to perform image viewing, image saving, and other related operations through interaction with the user application 100. By interposing the multi-target controller 120 between the user application 100 and the plurality of clients 140, the user application 100 can operate in a manner so that a user feels as if he or she is accessing a single server even if targets (e.g., files or portions of a file) to be displayed in a draw region are dispersed among a plurality of servers.

When such data (targets) to be displayed in the draw region of the user application 100 are dispersed among a plurality of servers, the multi-target controller 120 issues window-request parameters to the clients 140 accessing the corresponding servers in accordance with window-request parameters requested from the user application 100. Thus, the multi-target controller 120 causes the clients 140 to synchronously issue window requests to the corresponding servers. The clients 140 return to the multi-target controller 120 a plurality of pieces of draw data that is obtained by expanding target data (e.g., compressed code) returned from the respective servers. The multi-target controller 120 combines the plurality of pieces of drawing data returned from the respective clients 140 into single draw data and returns the single draw data to the user application 100 as a result of the request.

Such an operation can provide the advantages described below, such as synchronization of a plurality of targets displayed in a draw region with respect to zoom level, pan position, and other parameters.

As described in FIG. 1, the multi-target controller 120 may be functionally divided into a draw-region management unit 121, a request-parameter division unit 122, and a drawing-data combination unit 123. The multi-target controller 120 may further include a timer 124 as needed. It is to be noted that such functional division is not an absolute one and the multi-target controller 120 may be functionally divided in any other suitable form.

Each client 140 includes a control unit 141 to control an entire operation, a parameter receiving unit 142 to receive parameters transmitted from the multi-target controller 120, a server access unit 143 to access a remote server, a cache unit 144 to temporarily save data returned from the remote server, an expansion unit 145 to expand the returned data (e.g., compressed codes), and a buffer unit 146 to temporarily retain the data expanded using the expansion unit 145 until the expanded data is transmitted to the multi-target controller 120.

Next, a description is given of each component of the multi-target controller 120.

Draw-Region Management Unit 121

The draw-region management unit 121 manages parameters on, for example, the associations between respective portions of the draw region (the view window seen from the user application 100) and the clients 140, the draw size and position of data returned from each client 140, and so on. More specifically, the draw-region management unit 121 separately manages for each client 140 parameters, such as server name, file name, protocol name, channel name, view-window request parameter, meta-data request parameter, buffer-size parameter, server-control parameter, cache-management parameter, an upload parameter, client performance parameter, and draw position.

Request-Parameter Division Unit 122

The request-parameter division unit 122 divides the request parameters specified through the user application 100 into sets of parameters for window requests issued to the servers, which are accessed by the clients 140 associated with respective portions of the draw region, and issues the window-request parameters to the clients 140. The types and values of parameters output from the request-parameter division unit 122 vary depending on a lower-level protocol (a protocol managed by the draw-region management unit 121). For example, if the lower-level protocol is FTP protocol, such parameters include, for example, server name and file name but not a parameter indicating a portion of an image. Alternatively, for the JPIP protocol, the request-parameter division unit 122 can accompany various parameters, as described above, managed by the draw-region management unit 121 as the window-request parameters.

Draw-Data Combination Unit 123

The draw-data combination unit 123 combines a plurality of pieces of draw data returned from the respective clients 140 into data forming a single draw data (hereinafter "single draw data") by positioning the plurality of pieces of draw data at the corresponding draw regions managed by the draw-region management unit 121. The combined draw data is passed to the user application 100 as a result of the request.

Figure 2:
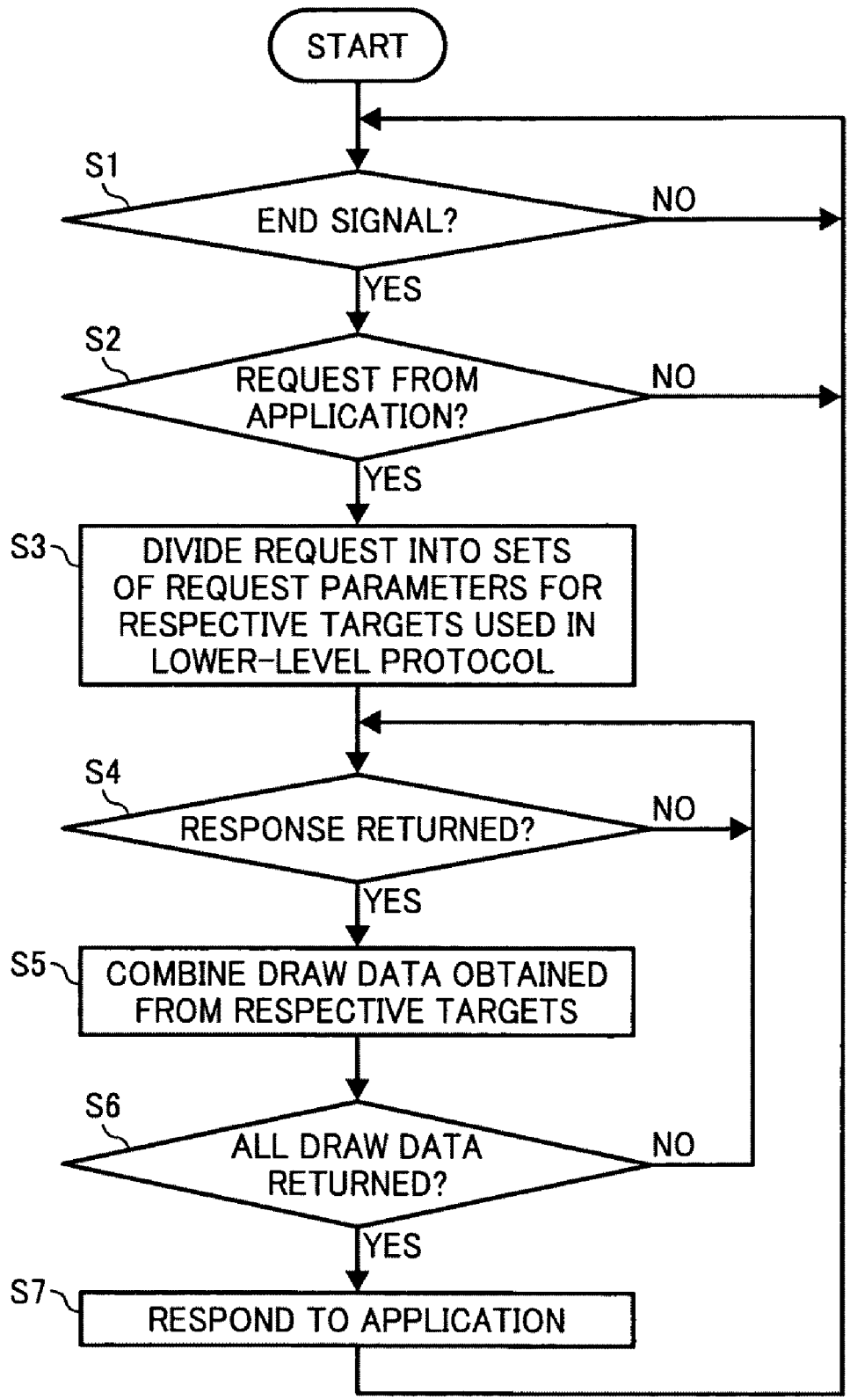
FIG. 2 is a flowchart illustrating a basic operation of a multi-target controller.

FIG. 2 is a flow chart illustrating basic operation of the multi-target controller 120.

Having received a request from the user application 100 ("YES" at S2), at S3 the request-parameter division unit 122 divides the request into sets of request parameters for the respective target targets used in a lower-level protocol. The request-parameter division unit 122 also transmits the sets of request parameters to the corresponding clients 140 and waits for responses from the clients 140. The clients 140 synchronously or sequentially access a plurality of servers while data are asynchronously returned from the servers.

When draw data is returned from one client 140 ("YES" at S4), at S5 the draw-data combination unit 123 combines the returned draw data with already-received draw data. The process from S4 to S6 is repeated until all requested draw data are returned.

When a final piece of draw data is received and combined ("YES" at S6), at S7 the combined draw data is returned to the user application 100.

In the foregoing description, the image processing system 1000 according to the present illustrative embodiment is generally described. Below, the image processing system 1000 is described in more detail. In the following description, it is assumed that the lower-level protocol is the JPIP protocol described in IS15444-9 JPIP (JPEG2000 Part 9: Interactivity tools, APIs and Protocols), i.e., that the clients 140 and the servers are JPIP clients and JPIP servers using the JPIP protocol.

In the following description, as described above, the term "target" indicates both a file and a portion of a file, which may be also referred to as a "sub-target".

Example 1

Figure 3:
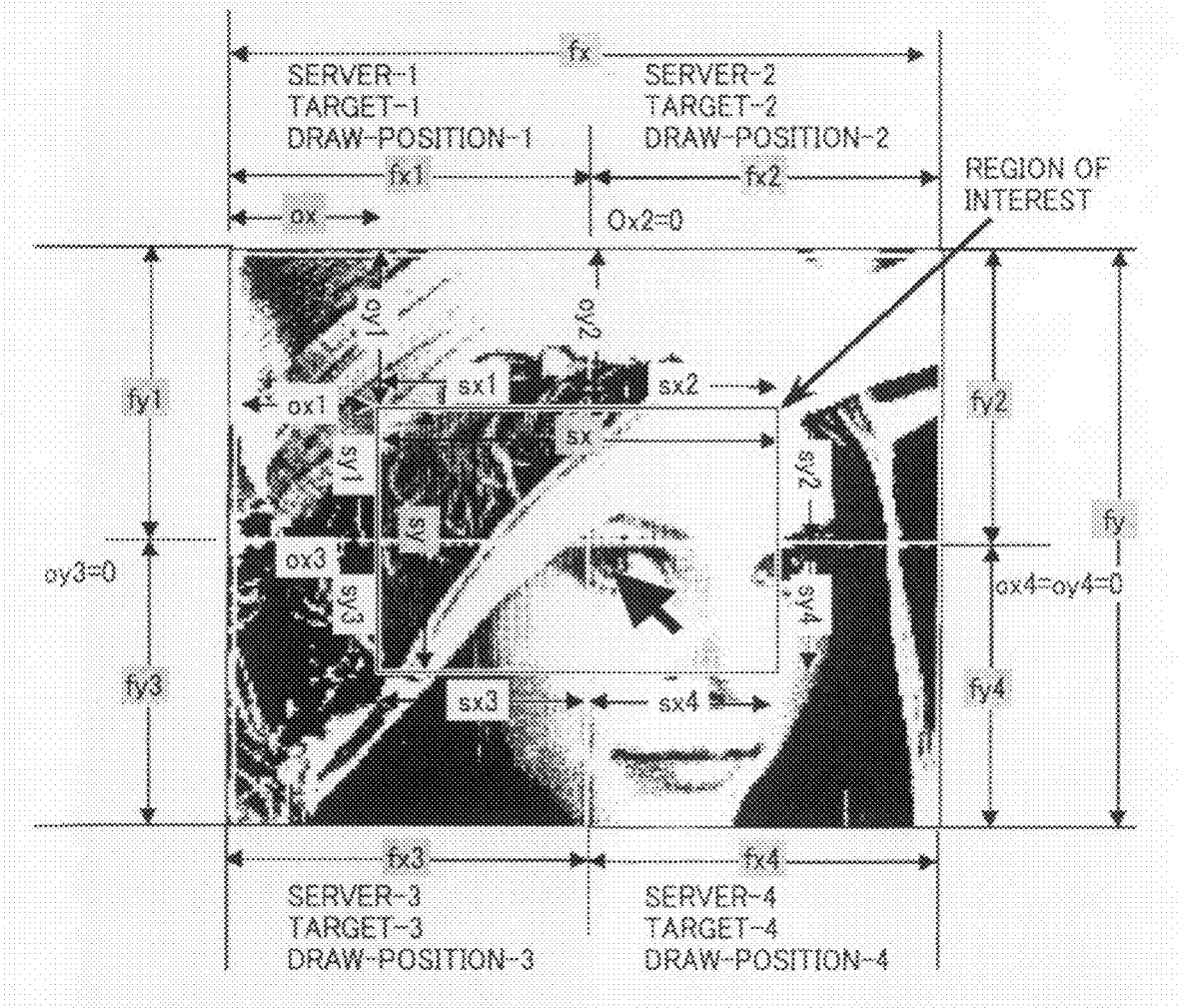
FIG. 3 is an illustration of a display example in which images stored in a plurality of servers are seamlessly displayed and a mapping example in which parameters for respective clients are mapped to corresponding targets.

In this example, as illustrated in FIG. 3, a description is given of a case in which targets-1 to -4 stored in servers-1 to -4 are accessed as targets to be displayed in a draw region (a region of interest of the JPIP protocol). Data on the targets-1 to -4 acquired through the access is expanded to a plurality of pieces of draw data, which are mapped at respective draw positions-1 to -4 of the draw region. In this case, the four targets-1 to -4 are divided images that form a unified single image, and are displayed as a seamless image on the draw region.

In the multi-target controller 120, the draw-region management unit 121 sets a client-1 to parameters, for example, as follows:
server-name=server-1,
target-name=file-1,
protocol-name=JPIP,
channel-name=0,
view-window-request-parameter=(described below),
meta-data-request-parameter=(as needed),
buffer-size-parameter=(as needed),
server-control-parameter=(as needed),
cache-management-parameter=(as needed),
upload-parameter=(as needed),
client-capability-parameter=(as needed),
draw-position=draw-position-1.

Likewise, the draw-region management unit 121 sets the other clients-2 to -4 to desired parameters.

The request-parameter division unit 122 divides view-window request parameters designated from the user application 100 into sets of parameters required for window requests which the clients-1 to -4 corresponding to respective portions of the draw region issue to the servers-1 to -4.

As described above, in this example, respective targets to be displayed in the four areas of the draw region (the region of interest) illustrated in FIG. 3 are separately stored in the servers-1 to -4. The data obtained by accessing the four targets are expanded into a plurality of pieces of draw data, which is drawn at the corresponding draw positions-1 to -4 as a seamless image.

Although the four images illustrated in FIG. 3 have the same size, such divided images do not necessarily have to have the same size. Thus, for example, a parameter, such as tile size or precinct size, may be different for each of the several JPEG2000 files (see WG1N2750 "Information Technology—JPEG2000 Image Coding System—Part 1 FDIS", Aug. 18, 2000).

According to C.4.2, C.4.3, and C4.4 of the IS15444-9, parameters are defined as nonnegative integers. Therefore, the view-window request parameters passed from the user application 100 need be converted to such nonnegative integers before being passed (issued) to the clients 140.

Here, it is assumed that the view-window request parameters passed from the user application 100 are as follows:
fsiz=(frame-size)=fx,fy;
roff=(offset from the origin point of a display area to a region of interest)=ox,oy; and
rsiz=(size of the region of interest)=sx,sy.

In this regard, view-window request parameters for the target-1 stored in the server-1 are as follows:
fsiz1=(frame-size-1)=fx1,fy1;
roff1=(offset-1 from the origin point of a display area to a region of interest)=ox1,oy1;
rsiz1=(size-1 of the region of interest)=sx1,sy1,
view-window request parameters for the target-2 stored in the server-2 are as follows:
fsiz2=(frame-size-2)=fx2,fy2;
roff2=(offset-2 from the origin point of a display area to a region of interest)=ox2,oy2;
rsiz2=(size-2 of the region of interest)=sx2,sy2, view-window request parameters for the target-3 stored in the server-3 are as follows:

fsiz3=(frame-size-3)=fx3,fy3;
roff3=(offset-3 from the origin point of a display area to a region of interest)=ox3,oy3;
rsiz3=(size-3 of the region of interest)=sx3,sy3, and view-window request parameters for the target-4 stored in the server-4 are as follows:

fsiz4=(frame-size-4)=fx4,fy4;
roff4=(bffset-4 from the origin point of a display area to a region of interest)=ox4,oy4;
rsiz4=(size-4 of the region of interest)=sx4,sy4.

In FIG. 3, shaded parameters are known while parameters written in a white background are unknown. The draw-region management unit 121 determines unknown parameters based on correlations between those parameters.

Assuming that the draw-region management unit 121 of the multi-target controller 120 manages information like that illustrated in Table 1, the request-parameter division unit 122 determines parameters to be transmitted to each server based on the relation between the information in Table 1 and the coordinates of the region of interest specified by a user.

Table 1 shows an example in which one region of interest overlaps four targets (2 targets wide by 2 targets high).

TABLE 1

| Position | File Name | Partial image | Server Name |
| --- | --- | --- | --- |
| Upper left | File-1 | Draw-position-1 | Server-1 |
| Upper right | File-2 | Draw-position-2 | Server-2 |
| Lower left | File-3 | Draw-position-3 | Server-3 |
| Lower right | File-4 | Draw-position-4 | Server-4 |

For example, the request-parameter division unit 122 determines and issues parameters for the clients-1 to -4 as follows:

1. Client-1 accessing the server-1
    (1) Target-field parameter
        target="file-1"
    (2) Channel field
        If
        (ox1≧fx1 = ox≧fx1)
        or
        (oy1≧fy1 = oy≧fy1)
        is true, cclose (close the channel).
        If
        (ox1<fx1 = ox<fx)
        and
        (oy1<fy1 = oy<fy)
        or
        channel-name=0
        is true, issue CNEW (assign a new channel).
    (3) View-window request parameter
        fsiz=fx1,fy1;
        roff=ox1,oy1=ox,oy;
        rsiz=min(sx1,sx),min(sy1,sy)
            =min(fx1−ox1,sx),min(fy1−oy1,sy)
            =min(fx1−ox,sx),min(fy1−oy,sy).
2. Client-2 accessing the server-2.
    (1) Target-field parameter
        target="file-2"
    (2) Channel field
        If
        (ox2≧fx2 = ox≧fx2)
        or
        (oy2≧fy2 = oy≧fy2)
        is true, cclose (close the channel).
        If
        (ox2<fx2 = ox<fx)
        and
        (oy2<fy2 = oy<fy)
        or
        channel-name=0
        is true, issue CNEW (assign a new channel).
    (3) View-window request parameter
        fsiz=fx2,fy2;
        roff=ox2,oy2=0,oy;
        rsiz=min(sx2,sx),min(sy2,sy)
            =min(fx2−ox2,sx),min(fy2−oy2,sy)
            =min(fx2,sx),min(fy2−oy,sy).
3. Client-3 accessing the server-3.
    (1) Target-field parameter
        target="file-3"
    (2) Channel field
        If
        (ox3≧fx3 = ox≧fx3)
        or
        (oy3≧fy3 = oy≧fy3)
        is true, cclose (close the channel).
        If
        (ox3<fx3 = ox<fx)
        and
        (oy3<fy3 = oy<fy)
        or
        channel-name=0
        is true, issue CNEW (assign a new channel).
    (3) View-window request parameter
        fsiz=fx3,fy3;
        roff=ox3,oy3=ox,0;
        rsiz=min(sx3,sx), min(sy3,sy)
            =min(fx3−ox3,sx), min(fy3−oy3,sy)
            =min(fx3−ox,sx), min(fy3,sy).
4. Client-4 accessing the server-4.
    (1) Target-field parameter
        target="file-4"
    (2) Channel field
        If
        (ox4≧fx4 = ox≧fx4)
        or
        (oy4≧fy4 = oy≧fy4)
        is true, cclose (close the channel).
        If
        (ox4<fx4 = ox<fx)
        and
        (oy4<fy4 = oy<fy)
        or
        channel-name=0
        is true, issue CNEW (assign a new channel).
    (3) View-window request parameter
        fsiz=fx4,fy4;
        roff=ox4,oy4=0,0;
        rsiz=min(sx4,sx),min(sy4,sy)
            =min(fx4−ox4,sx),min(fy4−oy4,sy)
            =min(fx4,sx),min(fy4,sy).

In the clients-1 to -4, the parameter receiving unit 142 receives parameters passed from the multi-target controller 120. In accordance with the parameters, the server access unit 143 synchronously issues window requests to the servers-1 to -4. A plurality of pieces of data on requested targets are returned from the servers-1 to -4 to the clients-1 to -4, in an operation which may be performed asynchronously. The clients-1 to -4 add to the cache unit 144 the plurality of pieces of target data (in this example, JPEG2000 codes) returned from the servers-1 to -4, expand the data cached on the cache unit 144 using the expansion unit 145 into a plurality of pieces of draw data, and return the plurality of pieces of draw data to the multi-target controller 120 via the buffer unit 146. The draw-data combination unit 123 of the multi-target controller 120 arranges the plurality of pieces of draw data returned from the clients-1 to -4 at respective draw positions managed by the draw-region management unit 123 to combine the plurality of pieces of draw data into single draw data. When the combined draw data is passed to the user application 100, as illustrated in FIG. 3 four target images are drawn in the draw region (region of interest).

Figure 4:
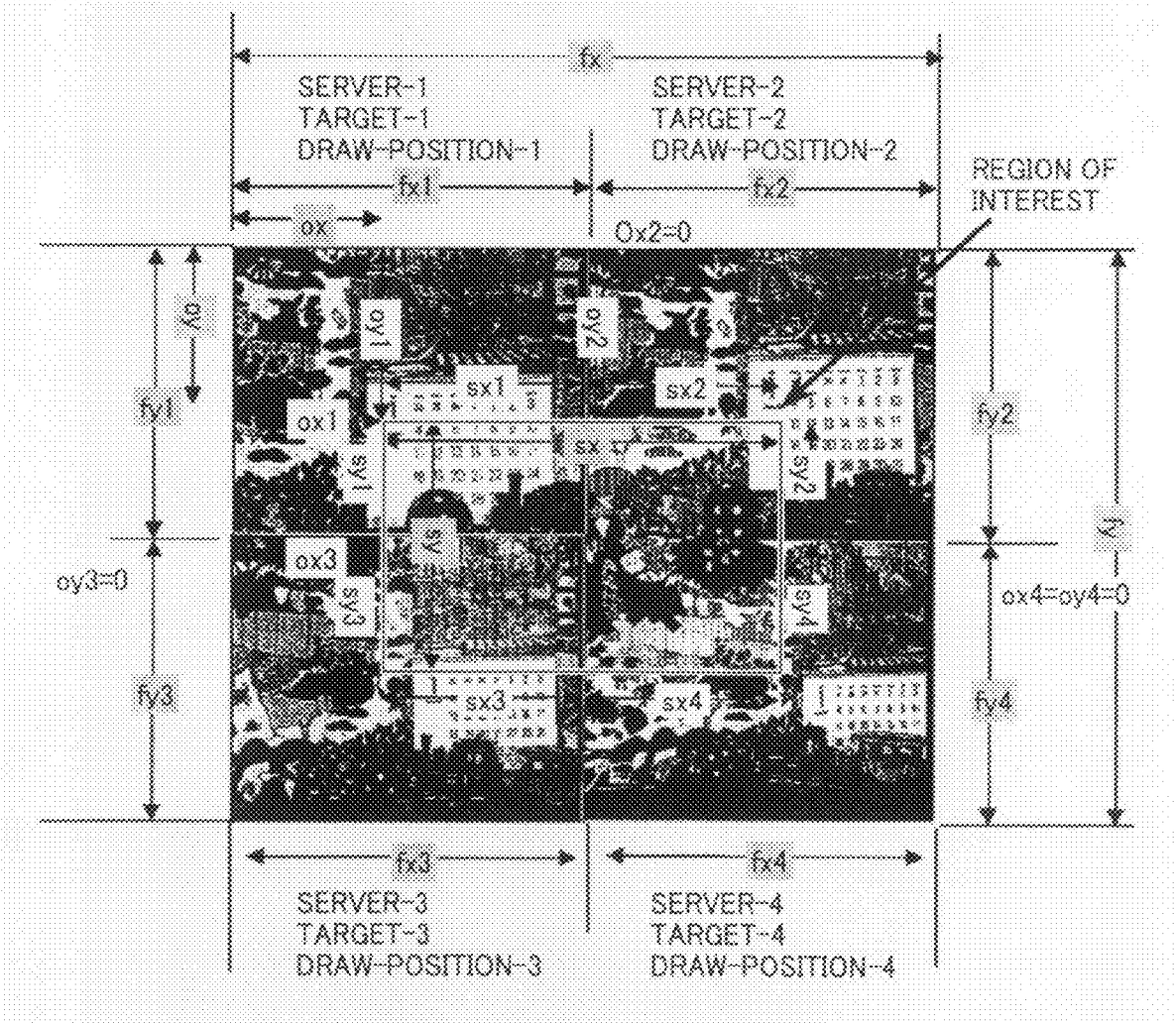
FIG. 4 is an illustration of a display example in which adjacent frames of a motion picture are synchronously displayed.

As described above, the four targets illustrated in FIG. 3 are the divided images that form a unified image. Alternatively, even when the targets are four adjacent frames of one motion picture as illustrated in FIG. 4, the present illustrative embodiment also allows the targets to be synchronously displayed. Further, even when the targets are corresponding scenes of four motion pictures, the present illustrative embodiment also allows the targets to be synchronously displayed.

Example 2

In this example, a description is given of an operation performed when a zoom request (zoom-in or out) is issued from the user application 100, for example, with images divided into four targets displayed as illustrated in FIG. 3.

Figure 5:
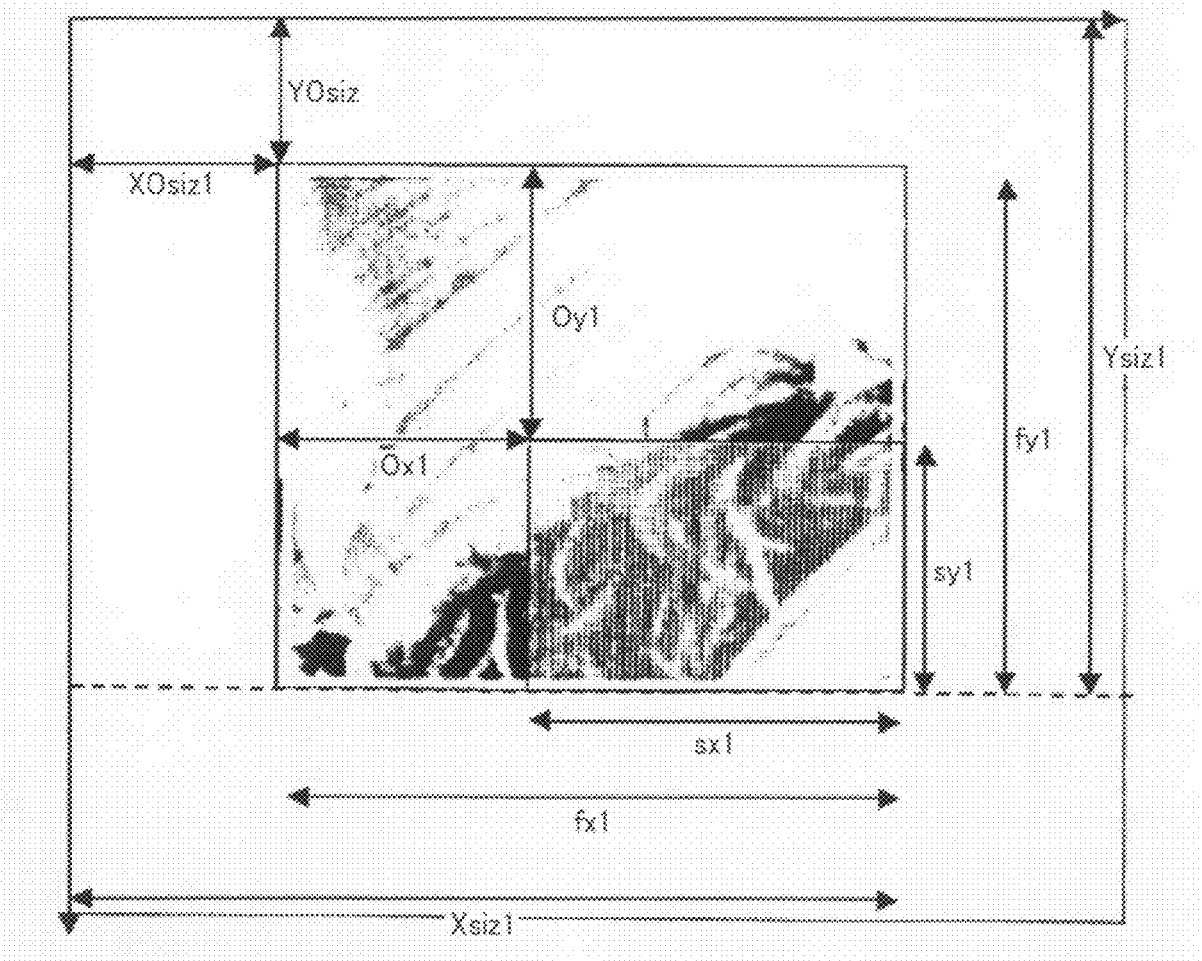
FIG. 5 is an illustration for explaining a zoom operation.

FIG. 5 is an illustration for explaining a zoom-in operation with reference to an example of the target-1 illustrated in FIG. 3, and shows relations between the size of the target-1 and the window-request parameters illustrated in FIG. 3. The other targets-2 to -4 can be considered in a similar manner.

In this example, as with the formula C.1 described in IS15444-9, the sizes of respective parameters of an original image are defined as follows:
  $Xsiz1$=horizontal length of image-1;
  $Ysiz1$=vertical length of image-1
  $XOsiz1$=horizontal offset of image-1 in reference grid;
  $YOsiz1$=vertical offset of image-1 in reference grid;
  $fx1$=X-direction length of frame size in JPIP client-1; and
  $fy1$=Y-direction length of frame size in JPIP client-1.

Accordingly, the sizes at a resolution level are defined as follows:
  $Xsiz1'$=horizontal length of image-1 at resolution level "r";
  $Ysiz1'$=vertical length of image-1 at resolution level "r";
  $XOsiz1'$=horizontal offset of image-1 in reference grid at resolution level "r";
  $YOsiz1'$=vertical offset of image-1 in reference grid at resolution level "r";
  $fx1'$=X-direction length of frame size in JPIP client-1 at resolution level "r"; and
  $fy1'$=Y-direction length of frame size in JPIP client-1 at resolution level "r".

As understood from FIG. 5, the following equation:

$$Xsiz1'-XOsiz1'=fx1'$$

is satisfied. Hence, in the multi-target controller 120, the draw-region management unit 121 assumes the following equation:

$$\text{magnification}=\text{newly-set-size}/\text{current-size}$$

in any of zoom-in and zoom-out operations with respect to Fsiz already specified in the view-window request parameters, and at S3 in FIG. 2 causes all managed clients to synchronously operate so as to satisfy the following equation:

$$\text{new-}Fsiz=\text{preceding-}Fsiz\times\text{magnification}.$$

The foregoing description explains the operation of the draw-region management unit 121 performed when the zoom-in request is received. Other operations of the draw-region management unit 121 and operations of the request-parameter division unit 122 and the draw-data combination unit 123 are performed in ways similar to the above-described Example 1.

When the clients-1 to -4 synchronously issue view-window-requests for zooming, the servers-1 to -4 return a plurality of pieces of target data with the same zoom level in response to the requests. The clients-1 to -4 expand the plurality of pieces of target data into a plurality of pieces of zoomed draw data and return the zoomed draw data to the multi-target controller 120. The multi-target controller 120 uses the draw-data combination unit 123 to combine the plurality of pieces of zoomed draw data into single draw data and passes the single draw data to the user application 100 as a result of the zoom request. Thus, the zoom levels of the plurality of pieces of draw data are synchronized.

Figure 6:
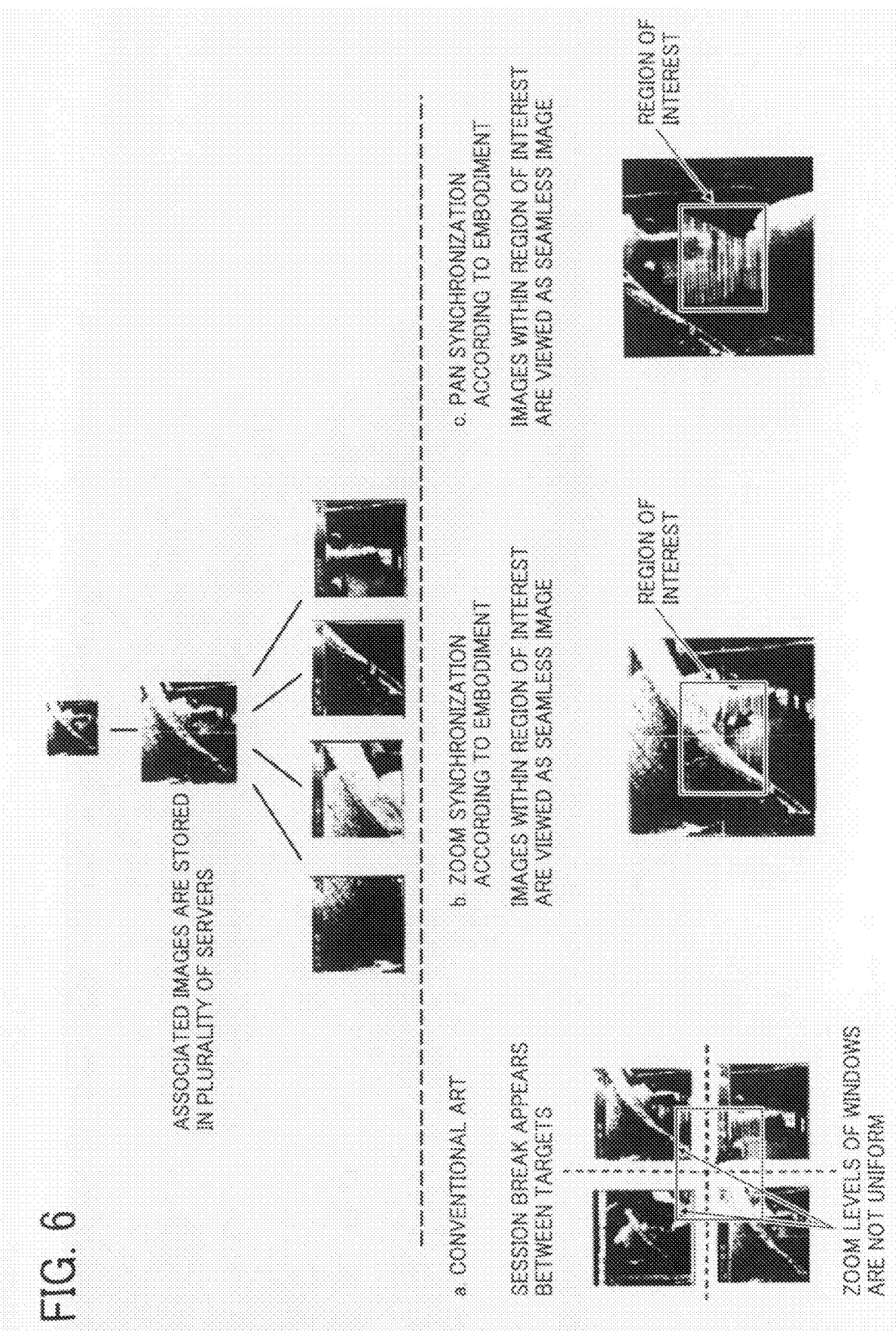
FIG. 6 is an illustration for explaining a zoom operation and a pan operation.

As described above, with the request for a zoom operation as well, the present illustrative embodiment allows the image processing system 1000 to synchronize the zoom levels of all targets while making a user feel as if he or she is accessing only one server through the user application 100. Further, even if a desired image is in fact divided into a plurality of targets, the image can be displayed as a single seamless image (see "b" in FIG. 6).

As illustrated in FIG. 4, when adjacent four frames in one motion picture are displayed or associated frames of four motion pictures are displayed, the above-described synchronized zoom operation can be similarly performed.

Example 3

In this example, a description is given of an operation performed when a panning request is issued from the user application 100, for example, with an image divided into four targets displayed as illustrated in FIG. 3.

As shown in FIG. 3, parameters are defined as follows:
  $Ox1$=X-direction offset to target-1;
  $Oy1$=Y-direction offset to target-1;
  $Ox1'$=X-direction offset to target-1 at resolution level "r"; and
  $Oy1'$=Y-direction offset to target-1 at resolution level "r".

Accordingly, with respect to "Roff" already specified in the view-window request parameters, at S3 in FIG. 2 the draw-region management unit 121 synchronously operates all managed clients so as to satisfy the following relation:

$$\text{new } R\text{off to target-}I=(Oxi',Oyi').$$

The foregoing description explains the operation of the draw-region management unit 121 performed when the pan request is received. Other operations of the draw-region management unit 121 or operations of the request-parameter division unit 122 and the draw-data combination unit 123 are performed in ways similar to the above-described example 1.

When the clients-1 to -4 synchronously issue view-window requests for pan operation, the servers-1 to -4 return a plurality of pieces of panned data in response to the requests. Further, the clients-1 to -4 expand the panned data into a plurality of pieces of draw data and return the plurality of pieces of draw data to the multi-target controller 120. The multi-target controller 120 uses the draw-data combination unit 123 to combine the plurality of pieces of draw data into single draw data and passes the single draw data to the user application 100 as a result of the panning request.

Thus, for the panning request as well, the present illustrative embodiment allows the image processing system 1000 to synchronize the pan positions of all targets while making a user feel as if he or she is accessing only one server through the user application 100. Further, even if a desired image is in fact divided into a plurality of targets, the image can be displayed as a single seamless image (see "c" in FIG. 6).

Further, as illustrated in FIG. 4, even when adjacent four frames of one motion picture are displayed or associated frames of four motion pictures are displayed, synchronization of pan positions can be similarly performed.

Example 4

In this example, a description is given of an operation performed, for example, when a color-component request for transforming a displayed image from color to monochrome is issued from the user application 100 with the image divided into four targets displayed as illustrated in FIG. 3.

As described in C.4.5 of IS15444-9, the JPIP window-request parameters include a parameter "comps" indicating color component.

For example, when a displayed image is transformed from color to monochrome, view-window requests accompanying a common parameter value of "comps=0" may be issued from the clients-1 to -4 to the servers-1 to -4.

Hence, the draw-region management unit 121 sets the client-1 accessing the server-1 to:

Fsiz1=fx1',fy1'&Roff=ox1',
oy1'&Rsiz=sx1'&sy1'&comps=0;
the client-2 accessing the server-2 to:
Fsiz2=fx2',fy2'&Roff=ox2',
oy2'&Rsiz=sx2'&sy2'&comps=0;
the client-3 accessing the server-3 to:
Fsiz3=fx3',fy3'&Roff=ox3',
oy3'&Rsiz=sx3'&sy3'&comps=0; and
the client-4 accessing the server-4 to:
Fsiz4=fx4',fy4'&Roff=ox4',
oy4'&Rsiz=sx4'&sy4'&comps=0.

The foregoing description explains the operation of the draw-region management unit 121 performed when the color-component request is received. Other operations of the draw-region management unit 121 and operations of the request-parameter division unit 122 and the draw-data combination unit 123 are performed in ways similar to the above-described Example 1.

When the clients-1 to -4 synchronously issue color-component requests (in this example, view-window requests for monochrome display), the servers-1 to -4 return a plurality of pieces of target data having the same color component (in this example, brightness component). The clients-1 to -4 expand the plurality of pieces of target data into a plurality of pieces of draw data having the same color component and return the draw data to the multi-target controller 120. The multi-target controller 120 uses the draw-data integration unit 123 to combine a plurality of pieces of draw data into single draw data, and passes the single draw data to the user application 100 as a result of the color-component request.

Thus, according to the present illustrative embodiment, for the color-component request as well, the image processing system 1000 can synchronously display all targets in monochrome while making a user feel as if he or she is accessing only one server through the user application 100.

Figure 7:
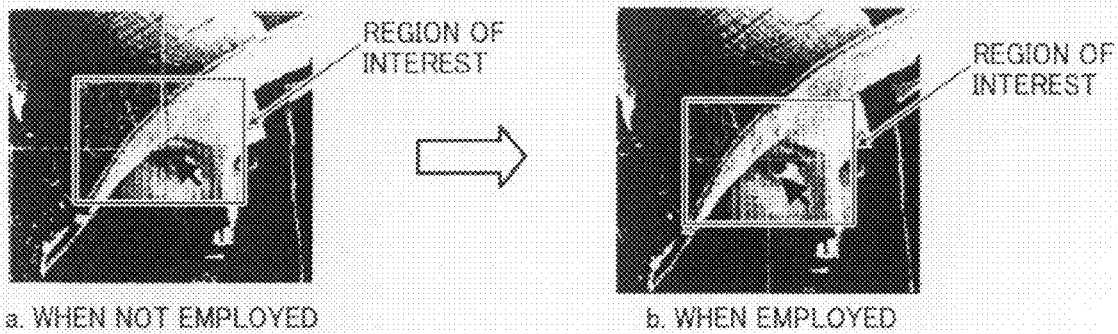
FIG. 7 is an illustration for explaining synchronization of color components.

For example, when the present illustrative embodiment is not applied, as illustrated in "a" of FIG. 7 color portions and monochrome portions may be concurrently displayed. However, according to the present illustrative embodiment, as illustrated in "b" of FIG. 7 all portions can be synchronously displayed in monochrome.

Alternatively, when a displayed image is transformed from monochrome to color, a parameter "comps=1,2" may be added so that only a color-difference component becomes accessible.

Further, according to the present illustrative embodiment, when four adjacent frames of one motion picture are displayed as illustrated in FIG. 4, the above-described synchronized monochrome or color display can be similarly performed.

Example 5

In this example, a description is given of an operation performed when an image-quality request for changing the quality of an image is issued from the user application 100, for example, with the image divided into four targets displayed as illustrated in FIG. 3.

As described in IS15444-9, the JPIP window-request parameters include a parameter "layers" specifying image quality.

For example, when an image quality is changed to "layers=2", view-window requests accompanying a common parameter value of "layers=2" are issued from the clients-1 to -4 to the servers-1 to -4. Hence, in such a case, the draw-region management unit 121 of the multi-target controller 120 sets the client-1 accessing the server-1 to:

Fsiz1=fx1',fy1'&Roff=ox1',
oy1'&Rsiz=sx1'&sy1'&layers=2;
the client-2 accessing the server-2 to:
Fsiz2=fx2',fy2'&Roff=ox2',
oy2'&Rsiz=sx2'&sy2'&layers=2;
the client-3 accessing the server-3 to:
Fsiz3=fx3',fy3'&Roff=ox3',
oy3'&Rsiz=sx3'&sy3'&layers=2; and
the client-4 accessing the server-4 to:
Fsiz4=fx4',fy4'&Roff=ox4',
oy4'&Rsiz=sx4'&sy4'&layers=2.

The foregoing description explains the operation of the draw-region management unit 121 performed when an image-quality request is received. Other operations of the draw-region management unit 121 and operations of the request-parameter division unit 122 and the draw-data combination unit 123 are performed in ways similar to the above-described Example 1.

When the clients-1 to -4 synchronously issue color-component requests (in this example, view-window requests commonly accompanying "layers=2"), the servers-1 to -4 return a plurality of pieces of target data having the same level of image quality. The clients-1 to -4 expand the plurality of pieces of target data into a plurality of pieces of draw data having the same level of image quality and return the draw data to the multi-target controller 120. The multi-target controller 120 combines the plurality of pieces of draw data into single draw data and passes the single draw data to the user application 100 as a result of the image-quality request.

Thus, according to the present illustrative embodiment, for the image-quality request as well, the image processing system 1000 makes uniform the image qualities of all targets while making a user feel as if he or she is accessing only one server through the user application 100.

Figure 8:
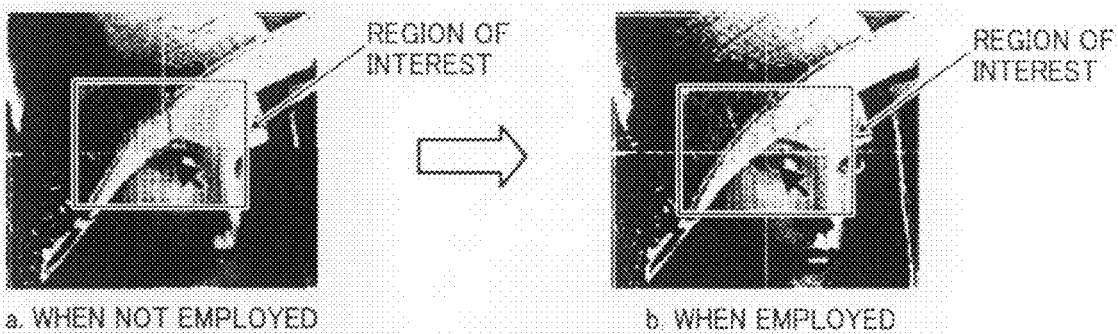
FIG. 8 is an illustration for explaining synchronization of image qualities.

When the present illustrative embodiment is not employed, a plurality of portions with different image qualities may be concurrently displayed as illustrated in "a" of FIG. 8. By contrast, with the present illustrative embodiment, when an image-quality request is issued through the user application 100, all portions can be synchronously displayed at the same level of image quality as illustrated in "b" of FIG. 8.

Likewise, when four adjacent frames of one motion picture are displayed as illustrated in FIG. 4 or when associated scenes of four motion pictures are displayed, the image qualities of all frames or scenes can be made uniform by issuing an image-quality request through the user application 100.

Example 6

For example, when four targets are expanded and drawn in predetermined positions as illustrated in FIG. 3, a distortion might appear around a boundary between adjacent images or tiles in each image. Below, a description is given of an example in which a seamless, high-quality image is displayed while suppressing such boundary distortion.

In this example, a tile-boundary-distortion suppressing unit (for example, as described in the Japanese Patent Application Publication No. 2001-257596) is added to each client 140. The tile-boundary-distortion suppressing unit may be added to the expansion unit 145.

Further, a new entry is created in the draw-region management unit 121 of the multi-target controller 120, and for example, a parameter indicating a location in which tile-boundary distortion is to be suppressed, such as "tile-boundary-distortion suppression location=lower right", may be added to the new entry.

A tile-boundary distortion that may appear in a target expanded in each client 140 is suppressed by correcting a wavelet coefficient value and performing inverse wavelet transform on the corrected value according to a procedure, for example, as described in the Japanese Patent Application Publication No. 2001-257596.

Alternatively, a tile-boundary distortion may appear at a location identified by a "tile-boundary-distortion suppression location" parameter between a target expanded in one client 140 and a target expanded in another client 140. Such a distortion is suppressed by transferring a wavelet coefficient of a relevant tile from the one client 140 to the other client 140 via the multi-target controller 120, correcting the wavelet coefficient in the other client 140, and performing inverse wavelet transform on the corrected wavelet coefficient as with the tile-boundary-distortion suppression in a single target (image). For such draw data subjected to such boundary-distortion suppression between targets, the draw-data combination unit 123 shifts the targets by an amount corresponding to a time for transferring a wavelet transform coefficient between the clients 140 to combine the targets.

Thus, a high-quality image with less boundary-distortion between different targets within a displayed region is returned to the user application 100. Other operations except the above-described distortion suppressing operation are performed in ways similar to the above-described Example 1.

Example 7

Here, a description is given of a case in which serial pages of a document separately stored in a plurality of servers are synchronously displayed. As one example, a description is given of a case in which, when four targets displayed as illustrated in "a" of FIG. 9 are non-serial pages P1, P34, P8, and P23, a serial-page request is issued from the user application 100 and serial pages are displayed (synchronized) based on the page P23 at which a cursor (arrow) is located within a draw region (region of interest).

As described in C.4.10 of 3.2 Section C.4.7", JPIP AMD1 FDAM1, ISO/IEC JTC1/SC29/WG1/N3806, Dec. 1, 2005, JPIP window-request parameters include the following parameter indicating serial pages:

jpm-context=jpmp.

Figure 9:
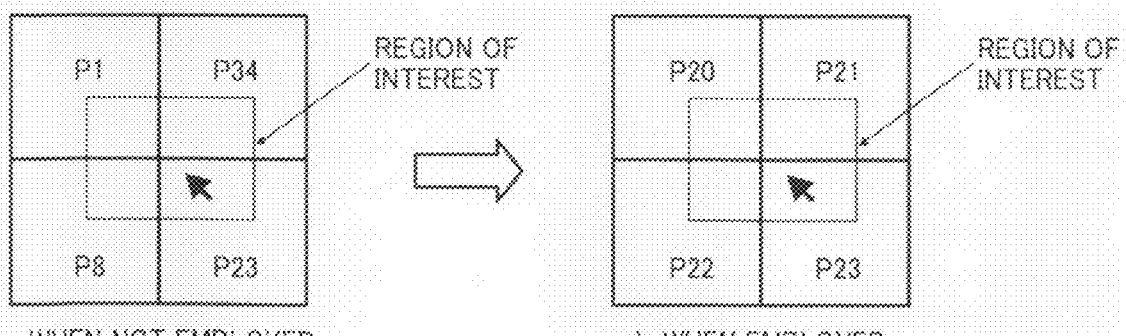
FIG. 9 is an illustration for explaining synchronization of serial pages.

When a serial-page request is issued at a state like that illustrated in "a" of FIG. 9, based on the page number 23 of the target-4 at which a cursor is located, parameters for the clients-1 to -3 are set so that the clients-1 to -3 issue, to the servers-1 to -3 storing the other targets-1 to -3, view-window requests accompanying the following common parameter "jpm-context=jpmp".

That is, the client-1 accessing the server-1 is set to:
Fsiz1=fx1',fy1'&Roff=ox1',oy1'&Rsiz=sx1'&sy1'&jpm-context=jpmp<20>;

the client-2 accessing the server-2 is set to:
Fsiz2=fx2',fy2'&Roff=ox2',oy2'&Rsiz=sx2'&sy2'&jpm-context=jpmp<21>; and the client-3 accessing the server-3 is set to:
Fsiz3=fx3',fy3'&Roff=ox3',oy3'&Rsiz=sx3'&sy3'&jpm-context=jpmp<22>.

The foregoing description explains the operation of the draw-region management unit 121 performed when a serial-page request is received. Other operations of the draw-region management unit 121 and operations of the request-parameter division unit 122 and the draw-data combination unit 123 are performed in ways similar to the above-described Example 1.

The clients-1 to -3 issue to the servers-1 to -3 view-window requests including the above-described parameters to access targets of the pages P20, P21, and P22. The clients-1 to -3 also expand the target data of pages P20, P21, and P22 returned from the servers-1 to -3 into draw data and pass the draw data to the multi-target controller 120, allowing the serial pages P20 to P23 to be synchronized as illustrated in "b" of FIG. 9

Example 8

As described in C.4.6 of IS15444-9, JPIP window-request parameters include a parameter "stream" indicating at least one codestream.

In this example, a description is given of an operation in which when synchronized stream- or codestream-box requests are issued to a plurality of servers, target data are combined based on data received through non-synchronous processing, and the combined data is returned to the user application 100 as a result of the stream- or codestream-box requests.

Figure 10:
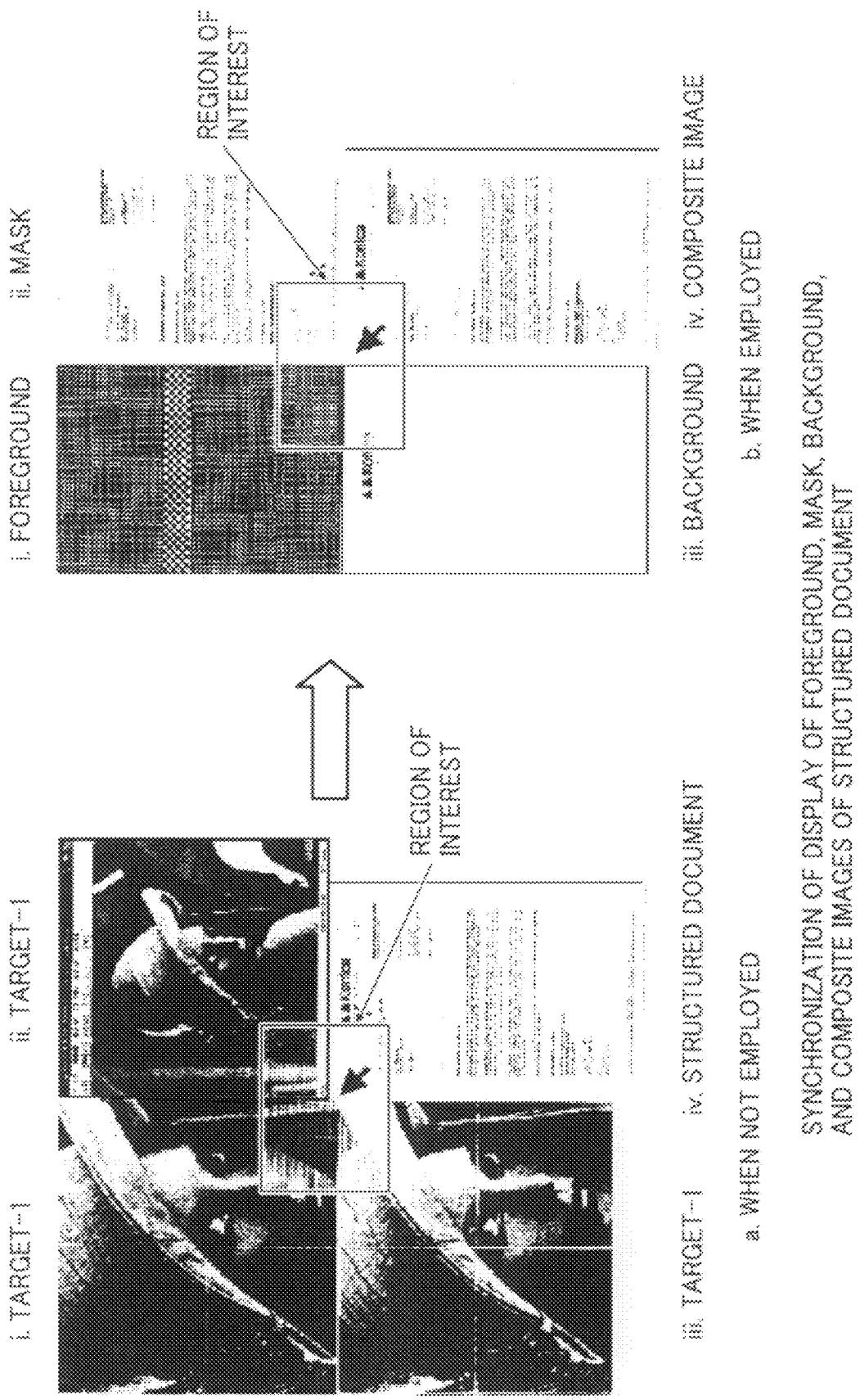
FIG. 10 is an illustration for explaining synchronization of foreground, mask, background, and synthesized images of a structured document.

For example, in "a" of FIG. 10, a compound image including three photographic images (of target-1) and one structured document (JPM document) is displayed in a draw region (region of interest). Below, a description is given of a case in which foreground, background, mask, and composite images of the structured document ("sample.jpm"), at which a cursor (arrow) is located, are synchronously displayed as illustrated in "b" of FIG. 10. This example assumes that the composite image of the structured document is obtained from the server-4.

The clients-1 to -3 specifies "target=sample.jpm" as the target name of the structured document to the servers-1 to -3 and issues view-window requests commonly accompanying stream ranges based on a position of the cursor in the draw region.

For example, the view-window request from the client-1 to the server-1 includes the following parameters:

GET /sample.jpm?tid=0&cnew=http HTTP/1.1
GET /jpip?cid=123&stream=0 HTTP/1.1
GET /jpip?fsiz=fx1,fy1'&roff=ox1',
    oy1'&rsiz=sx1',sy1'&cid=123 HTTP/1.1.

The view-window request from the client-2 to the server-2 includes the following parameters:

```
GET /sample.jpm?tid=0&cnew=http HTTP/1.1
GET /jpip?cid=234&stream=1 HTTP/1.1
GET /jpip?fsiz=fx1,fy1'&roff=ox1',
    oy1'&rsiz=sx1',sy1'&cid=234 HTTP/1.1.
```

The view-window request from the client-3 to the server-3 includes the following parameters:

```
GET /sample.jpm?tid=0&cnew=http HTTP/1.1
GET /jpip?cid=345&stream=2 HTTP/1.1
GET /jpip?fsiz=fx1,fy1'&roff=ox1',
    oy1'&rsiz=sx1',sy1'&cid=345 HTTP/1.1.
```

The foregoing description explains the operation of the draw-region management unit 121 performed when stream or codestream box requests are synchronized. Other operations of the draw-region management unit 121 and operations of the request-parameter division unit 122 and the draw-data combination unit 123 are performed in ways similar to the above-described Example 1.

When the clients-1 to -3 issue the above-described view-window requests to the servers-1 to -3, foreground, mask, and background data returned from the servers-1 to -3 are expanded and returned to the multi-target controller 120. At this time, draw data of the compound image are already obtained. Accordingly, the foreground, mask, background, and composite images of the structured document are synchronously displayed as illustrated in "b" of FIG. 10.

Thus, for the stream- or codestream-box request operation as well, a user can operate the user application 100 as if the user accessed only one server.

Example 9

Figure 11:
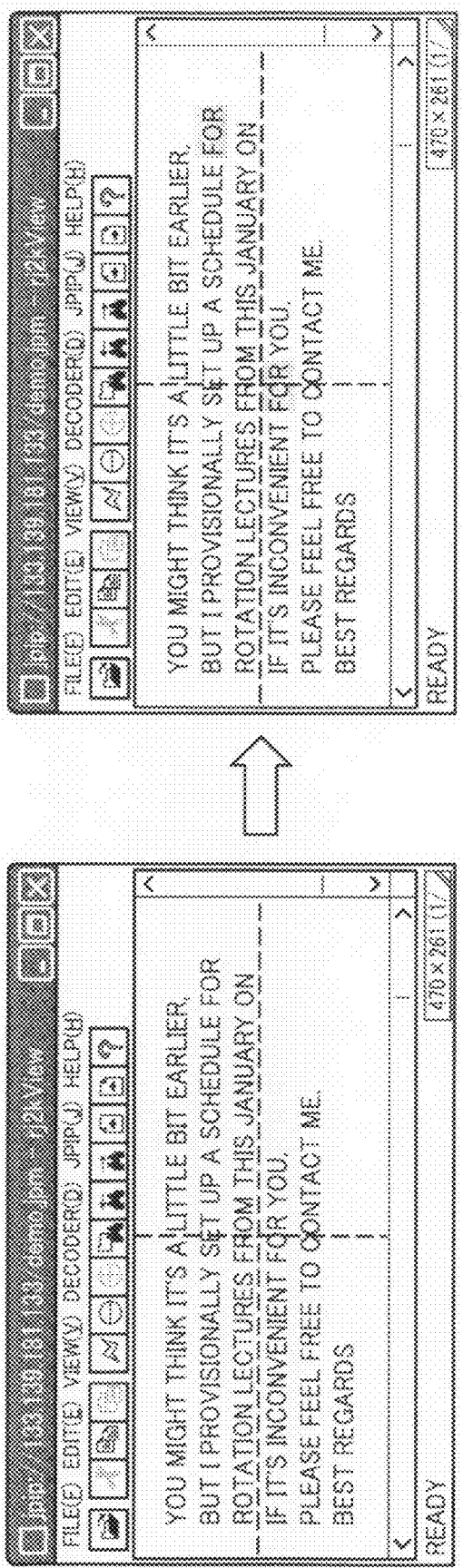
FIG. 11 is an illustration for explaining synchronization of images and hidden text and text retrieval.

In "a" of FIG. 11 is displayed an image combined from results of accessing the servers-1 to -4 using different target names. In such a case, since the combined image contains image information, text retrieval cannot be performed on the combined image.

By contrast, when image information and text information on the same targets as "a" of FIG. 11 are synchronously displayed, it is possible to perform text retrieval on the combined image to display retrieval results. For example, when the word "for" is retrieved, the word "for" can be highlighted in a plurality of targets as illustrated in "b" of FIG. 11.

Below, a description is given of an operation of synchronizing images and hidden texts to enable such text retrieval. For the operation, in response to a "metareq" request from the user application 100, a plurality of clients issues synchronized "metareq" requests to a plurality of servers, combines data received through non-synchronous processing, and returns the combined data to the user application 100.

In this example, a new entry is created in the draw-region management unit 121. For example, a parameter for requesting metadata is set as follows:
metadata-request=presence.

The request-parameter division unit 122 passes such metareq parameters to the clients-1 to -4, for example, according to a method described in C.5.2 of IS15444-9. The clients-1 to -4 transmit metadata request parameters as well as view-window request parameters to the servers-1 to -4 to access text information, which is metadata accompanying each target, as well as codestreams.

The clients-1 to -4 expand the codestreams returned from the servers-1 to -4 and transmit the text information as well as the expanded draw data to the multi-target controller 120. The draw-data combination unit 123 combines the draw data and text information. As a result, the draw data and retrievable text information coexist in the resultant image, allowing images and hidden text to be synchronized in a single document.

Accordingly, when text retrieval is executed from the user application 100, retrieved portions can be highlighted as illustrated in "b" of FIG. 11. Such a configuration allows a user to perform text retrieval across a plurality of targets dispersed among a plurality of servers.

The foregoing description explains the operation of synchronizing "metareq" requests. Other operations of the draw-region management unit 121, the request-parameter division unit 122, and the draw-data combination unit 123 are performed in ways similar to the above-described Example 1.

As described above, for the metareq request operation as well, the present illustrative embodiment allows a user to operate the user application 100 as if the user accessed only one server.

Example 10

In this example, a description is given of an operation performed when a multiple-document request is issued from the user application 100.

When a multiple-document request is issued from the user application 100, a plurality of clients issue to a plurality of servers multiple-document requests for requesting a plurality of documents in which associated positions are synchronized, a plurality of pieces of data received through asynchronous processing are combined in a manner so that associated positions are synchronized between the plurality of pieces of data, and the combined data is returned to the user application 100 as a result of the multiple-document request.

Figure 12:
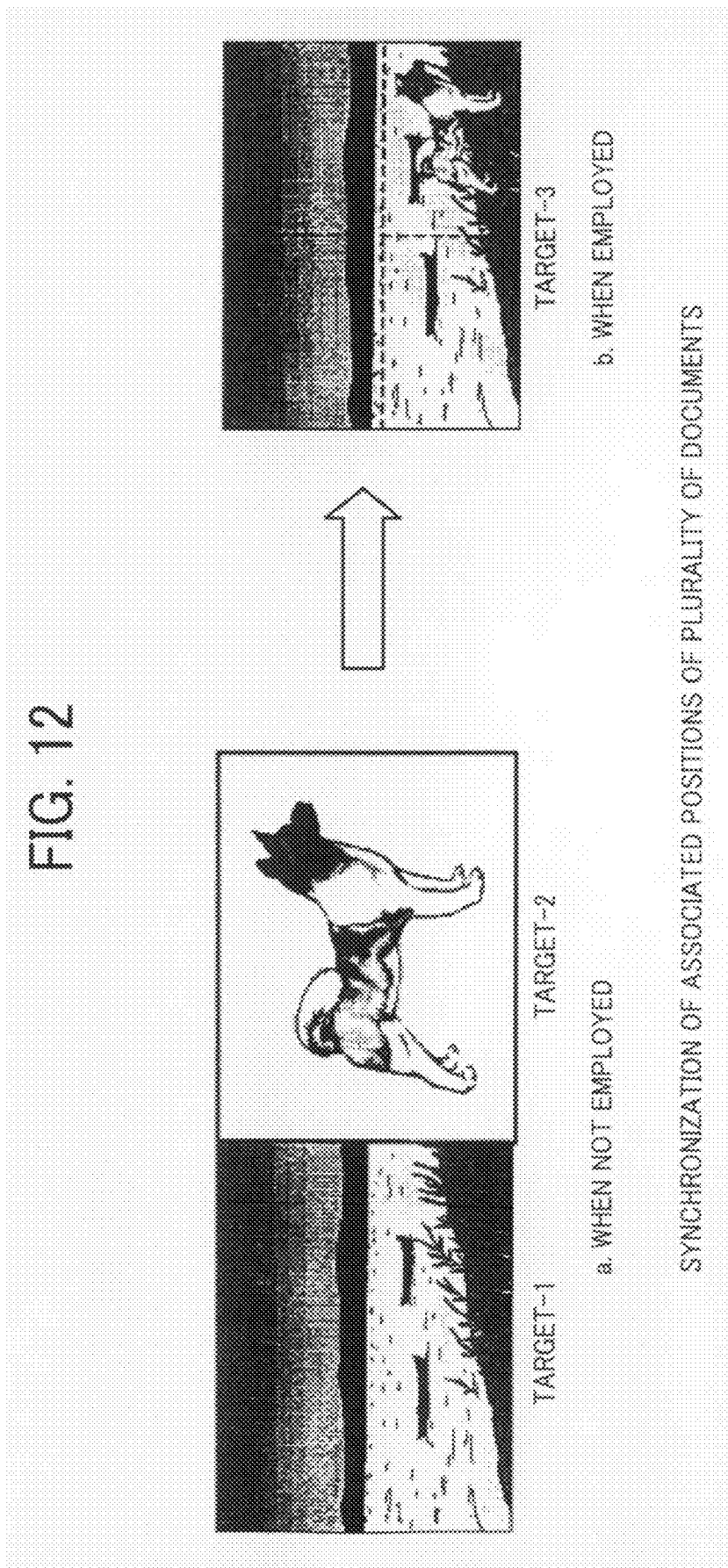
FIG. 12 is an illustration for explaining synchronization of associated positions between a plurality of documents.

This example assumes a case in which, with two targets-1 and -2 as illustrated in "a" of FIG. 12, corresponding positions are synchronously displayed as one target as illustrated in "b" of FIG. 12.

In such a case, for example, the draw-region management unit 121 sets the target-1 to parameters as follows:

```
server-name=server-1
target-name=file-1
view-window-request-parameter=Fsiz1
    =(fx1,fy1')=(fx,fy)
        (the other parameters are the same as the above-
        described example)
draw-position=draw-position-1,
and sets the target-1 to parameters as follows:
server-name=server-2
target-name=file-2
view-window-request-parameter=Fsiz1
=(fx2,fy2')=(fx,fy)
        (the other parameters are the same as the above-
        described example)
draw-position=draw-position-4.
```

To combine two targets (illustrated in "a" of FIG. 12) into one target (as illustrated in "b" of FIG. 12), the request-parameter division unit 122 references parameters of the relevant region in the draw-region management unit 121 so that the clients-1 and -2 access the servers-1 and -2 with the following parameter values:

Fsiz1=fx1',fy1'
Fsiz2=fx2',fy2'.

The clients-1 and -2 return to the multi-target controller 120 the draw data obtained by expanding the two targets returned from the servers-1 and -2.

The draw-data combination unit 123 references draw-position parameters of the draw-region management unit 121, combines the draw data received from the clients-1 and -2 so that the associated positions match between the draw data, and passes the combined image to the user application 100 as a result of the multiple document request. Thus, associated positions of two images can be synchronously displayed as illustrated in "b" of FIG. 12.

The foregoing description refers to a specific operation in the synchronization of associated positions, and other operations are performed in ways similar to the above-described Example 1.

As described above, in the document request operation as well, the present illustrative embodiment allows a user to operate the user application 100 as if the user accessed only one server.

Example 11

Next, a description is given of an operation of synchronizing a multi-layout object and a single-layout object. In this example, a multi-layout object (target-1) created with a PC (personal computer) and a single-layout object (target-2) scanned with an MFP (multi-functional peripheral) or a scanner, which have the same contents, are obtained from the servers-1 and -2 and displayed (or printed) side by side as illustrated in FIG. 13.

Here, for example, the following view-window request parameters are specified:
fsiz=(frame-size)=fx,fy
roff=(offset from the origin point of a display area to a region of interest)=ox,oy
rsiz=(size of the region of interest)=sx,sy.

Figure 13:
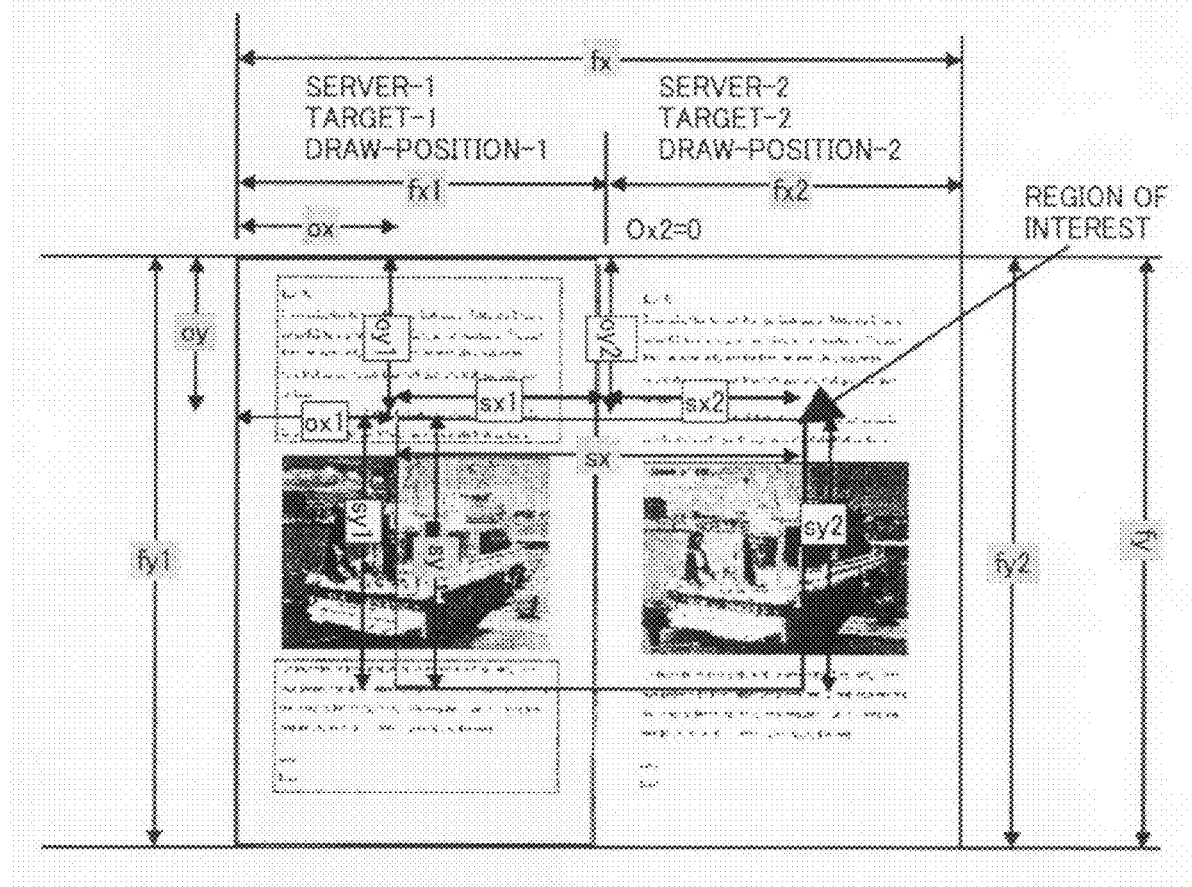
FIG. 13 is an illustration for explaining synchronization of a multi-layout object and a single-layout object.

In FIG. 13, hatched parameters are known while parameters illustrated in white background can be determined from such known parameters.

In such a case, the request-parameter division unit 122 determines parameters for the clients-1 and -2 accessing the servers-1 and -2 as follows.

The client-1 is set to the following parameters.

(1) target-field parameter
target="file-1"
(2) channel field
If
(ox1≧fx1 = ox≧fx1)
or
(oy1≧fy1 = oy≧fy1)
is true, cclose (close the channel).
Alternatively, if
(ox1<fx1 = ox<fx)
and
(oy1<fy1 = oy<fy)
or
channel-name=0
is true, issue cnew (assign a new channel).
(3) view-window request parameter
fsiz=fx1,fy1=fx/2,fy
roff=ox1,oy1=ox,oy
rsiz=min(sx1,sx),min(sy1,sy)
=min(fx1-ox1,sx),min(fy1-oy1,sy)
=min(fx1-ox,sx),min(fy1-oy,sy).
The client-2 is set to the following parameters.

-continued (1) target-field parameter
target="file-2"
(2) channel field
If
(ox2≧fx2 = ox≧fx2)
or
(oy2≧fy2 = oy≧fy2)
is true, cclose (close the channel).
Alternatively, if
(ox2<fx2 = ox<fx)
and
(oy2<fy2 = oy<fy)
or
channel-name=0
is true, issue cnew (assign a new channel).
(3) view-window request parameter
fsiz=fx2,fy2
roff=ox2,oy2=0,oy
rsiz=min(sx2,sx),min(sy2,sy)
=min(fx2-ox2,sx),min(fy2-oy2,sy)
=min(fx2,sx),min(fy2-oy,sy).

When the clients-1 and -2 issue synchronized view-window requests, the clients-1 and -2 expand the targets-1 and -2 returned from the servers-1 and -2 to a plurality of pieces of draw data and return the plurality of pieces of draw data to the multi-target controller 120. The draw-data combination unit 123 arranges the plurality of pieces of draw data, which are returned from the clients-1 and -2, at draw positions managed in the draw-region management unit 121 to combine the plurality of pieces of draw data into single draw data. Thus, as illustrated in FIG. 13, the multi-layout object image and the single-layout object image having the same contents are displayed side by side (in other words, the two objects are synchronized), allowing a user to easily compare the two objects.

Example 12

In this example, in the multi-target controller 120, the timer 124 monitors an elapsed time since a request is issued from the request-parameter division unit 122 to each client 140. If no response is returned from one client 140 within a certain period the normal multi-target controller 120 passes to the user application 100 a combination result of draw data already received and returns control to the user application 100. The above-described operation is applicable to any operation of the above-described Examples 1 to 11.

Figure 14:
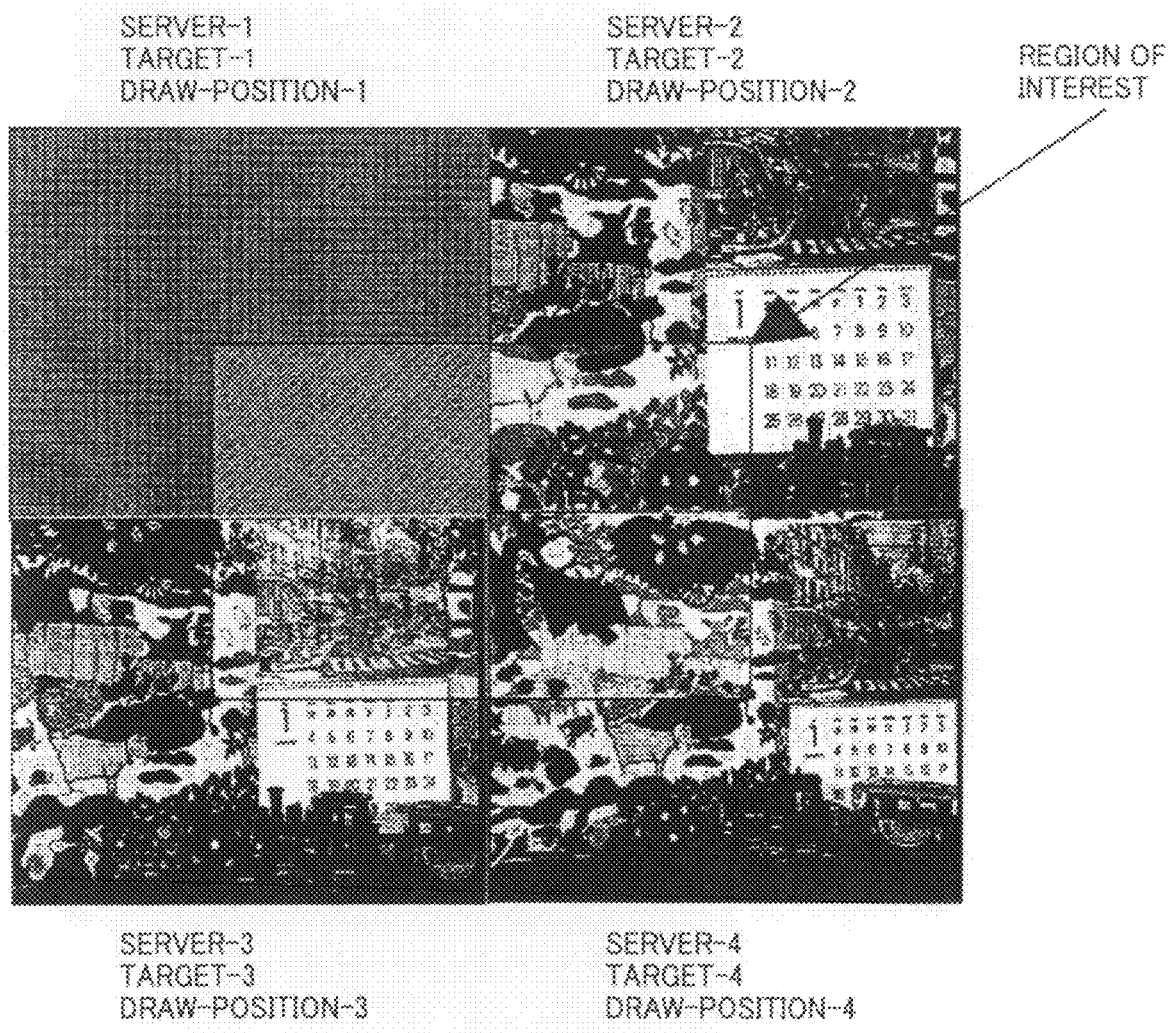
FIG. 14 is an illustration of a display example when a response is not received from one of a plurality of servers within a predetermined period.

FIG. 14 is an example of an image displayed when, with respect to the targets-1 and -4 stored on the servers-1 to -4, no response is returned within a certain time limit due to a failure of the server-1 or network.

The above-described configuration can prevent the system from staying in a wait state for a long time when a failure occurs in a network or server.

Example 13

In this example, when a response returned from a server is improper for some reason (for example, the response includes no target or an obtained target is protected by a security mechanism), the multi-target controller 120 passes to the user application 100 a combination result of draw data properly returned from servers and returns control to the user application lob. This operation is applicable to any operation of the above-described example 1 to 11.

FIG. 14 is also an example of an image displayed when, with respect to the targets-1 and -4 stored on the servers-1 to -4, a response from the server-1 is improper.

The above-described configuration can prevent the system from staying in a wait state for a long time when a proper response is not returned from a server for some reason.

Example 14

This example describes an illustrative embodiment of the present disclosure capable of effectively dealing with a single target.

Figure 15:
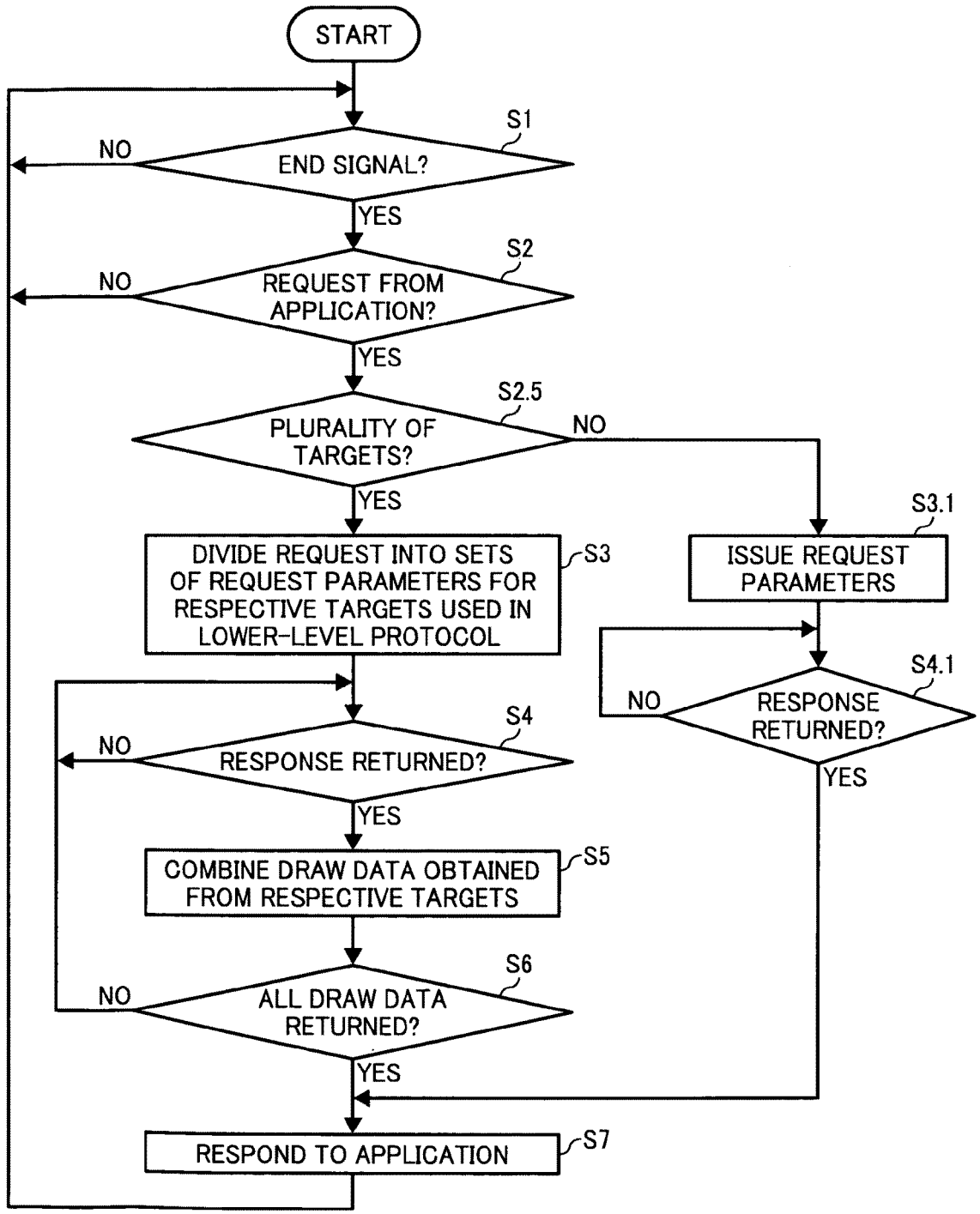
FIG. 15 is a flowchart illustrating a basic operation of a multi-target controller compatible with a single target.

FIG. 15 is a flow chart illustrating a basic operation of the multi-target controller 120 according to the present illustrating embodiment. In addition to the steps of the flow chart illustrated in FIG. 2, the flow chart illustrated in FIG. 15 further includes processing steps S2.5, S3.1, and S4.1 to deal with a single target, which differs from the flow chart illustrated in FIG. 2.

Receiving a request from the user application 100, at S2.5 the multi-target controller 120 determines whether the request falls in a single target or spans a plurality of targets based on the size of a display area and the coordinate and size of a region of interest of a user.

That is, with respect to equation C.2 described in C.4.1 of IS15444-9, assume the following equations:

$$fx' = \sum_i fxi',$$

$$ox' = \sum_i oxi',$$

$$sx' = \sum_i sxi'$$

$$fy' = \sum_j fyj',$$

$$oy' = \sum_j oyj',$$

$$sy' = \sum_j syj'$$

In such a case, if an image in a range (sx,sy) indicating an area which the region of interest of a user overlaps a display area (fx,fy) satisfies only i=j=1, the multi-target controller 120 determines that the target in question is a single target, or otherwise a multi target.

If the multi-target controller 120 determines that the target is a single target, the multi-target controller 120 passes parameters of the display area and the region of interest from the request-parameter division unit 122 to one client 140 corresponding to one server on which the target in question is stored, and at S3.1 causes the client 140 to issue window-request parameters to the server. At S4.1, the multi-target controller 120 waits a response from the client 140. Such an operation of issuing window-request parameters for a single target from one client to one server and processing a response from the server is described in detail in C.4 of IS15444-9.

Alternatively, if the multi-target controller 120 determines that the target is a multi target, the process branches to S3 and the operation for multi-target processing similar to the above-described examples 1 to 13 is performed.

Example 15

Here, a description is given of a case in which, when a plurality of targets (e.g., images) to be arranged on an x-y coordinate system in an infinite two-dimensional space are dispersed among a plurality of servers, a region of interest overlapping the plurality of targets is accessed.

For example, suppose that, for a plurality of images in which contents are connected with each other, one region of interest overlapping targets of "K" vertically by "L" horizontally from a two-dimensional system (i,j) is accessed at a certain resolution level. A divided state of a view-window region in this case is shown in Table 2.

TABLE 2

| Position | File Name | Partial Image | Server Name |
|---|---|---|---|
| upper-most left | file-(i,j) | draw-position-(i,j) | server-(i,j) |
| raw-direction arrangement | ... | ... | ... |
| upper-most right | file-(i+k,j) | draw-position-(i+k,j) | server-(i+k,j) |
| lowest left | file-(i,j+L) | draw-position-(i,j+L) | server-(i,j+L) |
| column-direction arrangement | ... | ... | ... |
| lowest right | file-(i+k,j+L) | draw-position-(i+k,j+L) | server-(i+k,j+L) |

Thus, any of the above-described operations described in the examples 1 to 13 can be extensively applied to the case in which a region of interest overlapping targets of "K" vertically by "L" horizontally from a two-dimensional system (i,j) is accessed at a certain resolution level (for example, it is apparent that Table 1 corresponds to when K=L=0 is satisfied in Table 2).

For such an operation of accessing a region of interest overlapping multi-targets, the number of clients 140 illustrated in FIG. 1 is expanded to (i+K)×(j+L), and the number of segments at S3 illustrated in FIG. 2 is expanded to (i+K)×(j+L)

Example 16

In this case, ends of images arranged on an infinite two-dimensional x-y coordinate system are connected in a vertical or horizontal direction. A description is given of an operation of accessing a region of interest overlapping a plurality of targets (images) when such images are dispersed among on a plurality of servers.

Here, suppose that, when ends of images of "m" horizontally×"n" vertically are connected with each other, a region of interest overlapping a plurality of targets of "K"×"L" is accessed. Table 3 show a divided state of a view-window region in such a case.

TABLE 3

| Position | File Name | Partial Image | Server Name |
|---|---|---|---|
| upper-most left | file-(i,j) | draw-position-(i,j) | server-(i,j) |
| raw-direction arrangement | ... | ... | ... |
| upper-most right | file-(i+(k mod m),j) | draw-position-(i+(k mod m),j) | server-(i+(k mod m),j) |
| lowest left | file-(i,j+(L mod n)) | draw-position-(i,j+(L mod n)) | server-(i,j+(L mod n)) |
| column-direction arrangement | ... | ... | ... |
| lowest right | file-(i+(k mod m),j+(L mod n)) | draw-position-(i+(k mod m),j+(L mod n)) | server-(i+(k mod m),j+(L mod n)) |

In Table 3, the term "k mod m" indicates a remainder of "k" when divided by "m".

By dividing the view-window region as described above, the present illustrative embodiment is applicable to when ends of images are connected. Further, ends of images may be connected in one of the vertical and horizontal directions or in both the vertical and horizontal directions.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of recording or storage medium.

Examples of such a recording or storage medium include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An image processing system, comprising:
a plurality of clients;
a plurality of servers;
a computer including a user application interactively operating with a user and a multi-target controller causing the plurality of clients to synchronously access the plurality of servers in response to a request from the user application, acquire from the plurality of servers a plurality of pieces of target data corresponding to a plurality of sub-regions in a draw region of the user application, and expand the plurality of pieces of target data into a plurality of pieces of draw data, the multi-target controller combining the plurality of pieces of draw data returned from the plurality of clients into single draw data and passing the single draw data to the user application, wherein the multi-target controller causes the plurality of clients to acquire a plurality of pieces of data on foreground, mask, and background of a structured document as the plurality of pieces of target data to draw foreground, mask, background, and composite images of the structured document on the plurality of sub-regions.

2. The image processing system according to claim 1, wherein, the multi-target controller causes the plurality of clients to acquire a plurality of pieces of data on partial images constituting a single seamless image as the plurality of pieces of target data to draw the single seamless image on the plurality of sub-regions.

3. The image processing system according to claim 1, wherein the multi-target controller causes the plurality of clients to acquire a plurality of pieces of data with the same zoom level on partial images constituting a single seamless image as the plurality of pieces of target data to synchronize zoom levels of the partial images of the single seamless image drawn on the plurality of sub-regions.

4. The image processing system according to claim 1, wherein the multi-target controller causes the plurality of clients to acquire a plurality of pieces of data on panned images constituting a single seamless image as the plurality of pieces of target data to synchronize pan positions of the panned images of the single seamless image drawn on the plurality of sub-regions.

5. The image processing system according to claim 1, wherein, the multi-target controller causes the plurality of clients to acquire a plurality of pieces of data with the same color component on partial images constituting a single seamless image as the plurality of pieces of target data to make uniform color components of the partial images of the single seamless image drawn on the plurality of sub-regions.

6. The image processing system according to claim 1, wherein, the multi-target controller causes the plurality of clients to acquire a plurality of pieces of data with the same level of image quality on partial images constituting a single seamless image as the plurality of pieces of target data to make uniform image qualities of the partial images of the single seamless image drawn on the plurality of sub-regions.

7. The image processing system according to claim 1, wherein, the multi-target controller causes the plurality of clients to acquire a plurality of pieces of data on serial pages of a document as the plurality of pieces of target data to draw the serial pages of the document on the plurality of sub-regions.

8. The image processing system according to claim 1, wherein, the multi-target controller causes the plurality of clients to acquire data on at least one image and text of a document as the plurality of pieces of target data to synchronize the at least one image and hidden text drawn on the plurality of sub-regions.

9. The image processing system according to claim 1, wherein, the multi-target controller causes the plurality of clients to acquire data on associated pages of a plurality of documents as the plurality of pieces of target data to draw the associated pages of the plurality of documents on the plurality of sub-regions.

10. The image processing system according to claim 1, wherein, the multi-target controller causes the plurality of clients to combine the plurality of pieces of draw data into single draw data so as to match associated positions between the plurality of pieces of draw data to synchronize the associated positions between a plurality of images drawn on the plurality of sub-regions.

11. The image processing system according to claim 1, wherein, the multi-target controller causes the plurality of clients to acquire a multi-layout object and a single-layout object of a document as the plurality of pieces of target data to draw the multi-layout object and the single-layout object on the plurality of sub-regions.

12. The image processing system according to claim 1, wherein, the multi-target controller causes the plurality of clients to acquire data on adjacent frames of a motion picture as the plurality of pieces of target data to draw the adjacent frames on the plurality of sub-regions.

13. The image processing system according to claim 1, wherein, the multi-target controller causes the plurality of clients to acquire data on associated scenes of a plurality of motion pictures as the plurality of pieces of target data to draw the associated scenes on the plurality of sub-regions.

14. The image processing system according to claim 1, wherein, when at least one of the plurality of clients does not return a response within a predetermined time limit after the multi-target controller causes the plurality of clients to synchronously access the plurality of servers, the multi-target controller combines a plurality of pieces of draw data returned from other clients except the at least one client into single draw data to pass the single draw data to the user application.

15. The image processing system according to claim 1, wherein, when at least one of the plurality of clients does not return a proper response, the multi-target controller combines a plurality of pieces of draw data returned from other clients except the at least one client into single draw data to pass the single draw data to the user application.

\* \* \* \* \*